United States Patent [19]
Nielson

[11] 3,727,423
[45] Apr. 17, 1973

[54] TEMPERATURE RESPONSIVE CAPACITY CONTROL DEVICE

[75] Inventor: Gary E. Nielson, Florissant, Mo.

[73] Assignee: Jackes-Evans Manufacturing Company, St. Louis, Mo.

[22] Filed: June 7, 1971

[21] Appl. No.: 150,416

Related U.S. Application Data

[62] Division of Ser. No. 888,359, Dec. 29, 1969, Pat. No. 3,633,379.

[52] U.S. Cl. ..................62/205, 62/210, 62/225, 236/92
[51] Int. Cl. .............................................F25b 41/04
[58] Field of Search..................62/202, 178, 180, 62/210, 211, 212, 225, 525; 236/92 B

[56] References Cited

UNITED STATES PATENTS

| | | | |
|---|---|---|---|
| 2,112,049 | 3/1938 | Roessler | 62/202 |
| 2,297,872 | 10/1942 | Carter | 62/211 |
| 2,363,010 | 11/1944 | Mitteson | 62/212 |
| 2,497,677 | 2/1950 | Lathrop | 62/212 |

*Primary Examiner*—Meyer Perlin
*Attorney*—Robert E. Wagner

[57] ABSTRACT

A capacity control arrangement adapted for use in air conditioning systems and the like to modulate the capacity of the system for greater uniformity in temperature and humidity. The system includes a novel capacity control valve located between the expansion means and the evaporator in an air conditioning system which controls the flow of refrigerant through the evaporator, operating in response to changes in temperature. As the temperature of the air approaches the set point, part of the passes through the evaporator are closed and, as a consequence, the remaining passes run colder for greater dehumidification. An artificial control means is provided whereby the capacity control valve may be remotely controlled independently of the actual temperature of the air flowing over the evaporator.

3 Claims, 3 Drawing Figures

INVENTOR
GARY E. NIELSON
BY Robert E. Wagner ATT'Y.

INVENTOR
GARY E. NIELSON
BY Robert E. Wagner ATT'Y.

TEMPERATURE RESPONSIVE CAPACITY CONTROL DEVICE

This is a division of application Ser. No. 888,359 for Temperature Responsive Capacity Control Device and System, filed Dec. 29, 1969 by Gary Nielson and now U.S. Pat. No. 3,633,379, issued Jan. 11, 1972.

This invention relates to improvements in air conditioning systems and the like. More specifically, the present invention is directed to a novel capacity control arrangement particularly adapted for use in air conditioning systems and the like, and also a novelly constructed valve particularly adapted to control capacity in the novel arrangement.

In conventional air conditioning systems, the compressed refrigerant is allowed to expand into the evaporator by means of a known type of expansion device. Such expansion devices can consist of a simple capillary tube or an expansion valve and normally function to control the quantity of liquid refrigerant admitted to the evaporator. The typical expansion valve is responsive to the superheated vapor and is preset or adjusted to guard against liquid refrigerant returning to the suction side of the compressor. Control over temperature in a residence is left to the conventional-type thermostatic detector which responds to changes in the temperature of the residence by turning the compressor off or on. As is well known, the sensitivity of these thermostats results in temperature fluctuation of at least two or three degrees above and below the selected temperature which, of course, is undesirable.

One further problem which is encountered in known types of systems is the level of humidity in residences during the air conditioning season. Humidity can vary considerably within the comfort zone band which extends from about 72° to 85° with an average of about 79° being the average comfort line. As is well known, the discomfort index is a function of the wet bulb and dry bulb reading, with the former being a function of the humidity in the air. Accordingly, it can be easily appreciated that control of humidity is required if the comfort zone for a given temperature within the range attainable by the air conditioning system is to be predetermined and maintained.

In known types of air conditioning systems, when the differential between the actual and set temperatures is extreme, the expansion valve will remain at the fully opened position and the air conditioner operates at practically full capacity. This causes rapid dehumidification of the air as the temperature is lowered. When the thermostat is satisfied, the compressor is shut off. Humidity of the air begins to increase at a rapid rate while the temperature rise is much more gradual. During the period while the temperature is rising to a level sufficient to actuate the thermostat which starts the compressor, a certain amount of discomfort is experienced mainly because of the increase in humidity. On the average day, the compressor will cycle on and off in response to temperature changes within the residences and the periods of discomfort are experienced with each cycle.

Temperature changes within the limits of the thermostat will be over a rather wide range with the effect that the cooling cycle in a house, when plotted graphically, will resemble an alternating wave pattern extending several degrees above and below the selected or mean temperature. In the interest of comfort as well as cooling efficiency, it is desirable to maintain the temperature variation at minimum. Coupled with this is the need to maintain the level of humidity at an acceptable level within the comfort zone and, preferably, somewhere in the neighborhood of an average of 50 to 55 percent at 75°F. where the occupants are inactive or about 40 percent at 72°F. where the occupants are active.

The present invention is directed to a novel air conditioning arrangement having a novelly constructed capacity control valve which is temperature responsive and which will regulate the cooling capacity of the system to provide greater uniformity in temperature and humidity and, accordingly, provide greater comfort to the occupants. In the present system, certain of the pass lines through the evaporator are isolated from other pass lines. Part of the pass lines are connected directly to the expansion device, while the remaining pass lines in the evaporator are connected to the expansion device through the novel capacity control valve of the present invention. In response to temperature changes, a sensing bulb causes the capacity control valve to open and close to increase or decrease the amount of refrigerant admitted to the evaporator, subject to the overriding influence of the expansion valve which can cut off flow. As temperature in the residence rises, so will the air passing over the evaporator, causing the sensing bulb to actuate the capacity valve to the opened position, permitting more fluid to be admitted to the evaporator. When the temperature flowing over the evaporator is reduced to about the mean or set temperature, the valve approaches the closed position and only a part of the evaporator is filled with refrigerant, this being the section fed from the pass lines which bypass the capacity control valve.

As can be appreciated, in the conventional air conditioning system, capacity cannot be 100 percent controlled because a quantity of the vapor is required to return to the compressor to prevent compressor burnout. One hundred percent shut off is also undesirable because of the lack of humidity control. When the capacity control valve is completely closed, the refrigerant flowing through the bypass line to the normally open pass lines in the evaporator will cause that section of the evaporator to run colder and thereby cause a greater quantity of moisture to be condensed out of the air flowing over that part of the evaporator, yet the rate of cooling will be reduced relative to that available if the evaporator was operated at full capacity. This percentage of flow through the valve can be adjusted as the demand dictates by merely adjusting the lower temperatures at which the capacity control valve opens. In short, the capacity control is intended to carefully control the capacity of the system between 30 percent and 100 percent of the total.

The capacity control valve of the present invention is of uncomplicated construction and, accordingly, is economically manufactured and assembled. The capacity control valve consists of a two-part body, one part of which forms a fixed valve seat. A stem having a movable valve seat which co-operates with the fixed valve seat has the free end extending into engagement with the closed end of an expansible bellows. The interior of the bellows is filled with a liquid (hydraulic fluid) and is in closed communication with a sensing bulb which is located in the path of the air passing over the evaporator. The quantity of liquid in the bulb is large relative to the quantity of liquid in the expansion chamber whereby slight changes in temperature will cause expansion of the liquid in the bulb which, in turn, causes the bellows to expand, mechanically moving the movable valve seat away from the fixed valve seat to permit the refrigerant to flow through the valve. An artificial heating means may be provided beneath or in the sensing bulb to permit artificial heating of the bulb to cause opening of the capacity control valve even through the temperature of the air flowing over the evaporator is at the selected level. Thus, the capacity control may be readily adjusted and controlled from a remote source.

It is an object of this invention to provide a new and improved capacity control valve for use in air conditioning systems and the like.

It is a further object of this invention to provide a novel capacity control arrangement for use in conventional or known types of air conditioning systems.

It is a still further object of this invention to provide a novel capacity control arrangement which will provide better regulation of temperature for more uniform comfort control.

It is a further object of this invention to provide a new and improved capacity control arrangement which permits flow of refrigerant only in a part of the evaporator for good humidity control.

Objects other than those stated will become apparent when reference is made to the accompanying drawings wherein.

Figure 1:
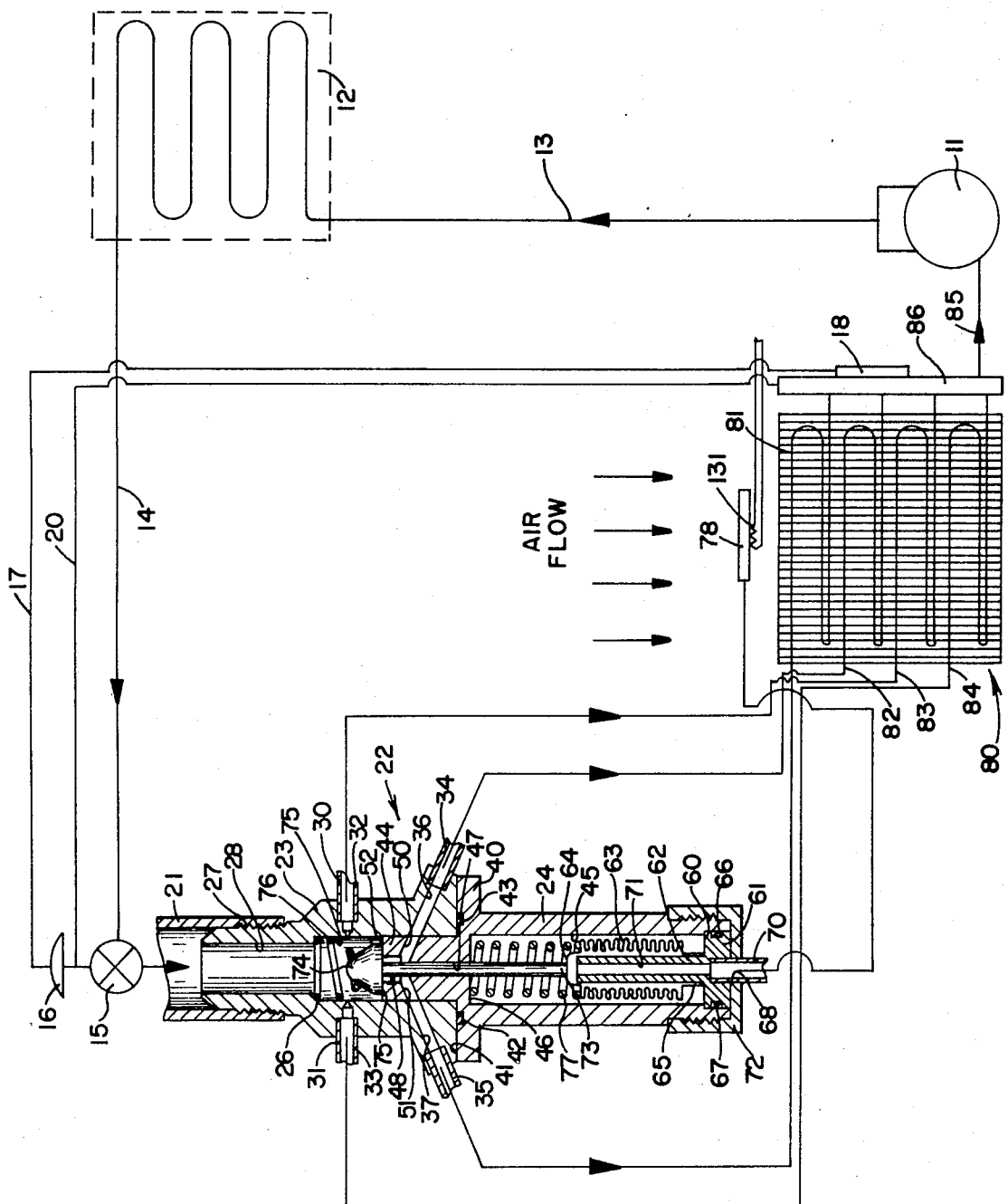
FIG. 1 is a schematic diagram of a refrigeration system which incorporates the capacity control valve of the present invention and which is shown in enlarged cross-sectional form with the valve in the closed position.

Referring now to FIG. 1, the temperature responsive capacity control system of the present invention is illustrated in the schematic diagram indicated generally by the reference character 10 and includes a compressor 11 and condenser 12 which are joined by a line 13 leading from the output port of the compressor to the input port of the condenser 12. The condensor 12 may be of any suitable design and in the usual residential air conditioning system is located adjacent the compressor unit. An outlet line 14 from the condensor 12 is joined to an expansion device 15 which, in the present instance, is illustrated schematically as an expansion valve. Obviously, any equivalent form of expansion device such as a capillary tube or the like is equally appropriate. The expansion device is controlled by a bellows 16 which, in turn, is in closed communication to a line 17 with a sensing bulb 18 normally positioned adjacent an evaporator unit indicated generally by the reference 80 and which will be described in greater detail. A pressure balancing line 20 leads from the expansion valve to the evaporator 80 and its function will also be described in greater detail subsequently. The outlet side of the expansion valve is connected through a line 21 to the capacity control valve of the present invention, which is indicated generally by the reference numeral 22.

The capacity control valve 22 is of simplified design and consists of a two-part body 23 and 24. For convenience of description, the part 24 will be referred to as the "bonnet" with the part 23 referred to as the "body." The body 23 is formed with a cylindrical bore 28 which is counterbored as at 25 to form a shoulder 26. The external configuration of the valve body 23 is generally cylindrical and is provided with threads 27 which cooperate with complementary threads formed in the line 21. Obviously, any other equivalent means of attachment such as a soldered joint, swage-type fitting or the like are equally satisfactory.

A pair of outlet openings 30 and 31 are formed in the body 23 to receive bypass lines 32 and 33, respectively. A pair of outlet ports 34 and 35 are joined for communication with outlet ports 36 and 37 formed in the body 23 and communicating with the counterbore 25.

The bonnet 24 is formed with a radially extending flange 40 which has a radially extending surface 41 provided with a groove 42 which receives a suitable sealing means such as an O-ring 43. The bonnet may be joined to the body by bolts (not shown) extending through the flange 40.

The bonnet 24 also is provided with a cylindrical extension 44 projecting axially from the surface 41, which extension is of reduced diameter relative to the flange 40, being sized to be received in the counterbore 25. A cylindrical bore 45 is formed in the bonnet 24 and terminates in a radial shoulder 46 which is radially inward of the flange 40. A bore of reduced diameter 47 is formed centrally of the shoulder 46 and is coaxial with the bore 45 and the circumferential surface of the cylindrical extension 44. The outer end of the bore 47 is enlarged as at 48 to provide an opening of increased size for reasons to become apparent. At the bottom of the enlarged opening 48 is formed a pair of radially and axially directed outlet ports 50 and 51 which are located for communication with the outlet ports 36 and 37 formed in the body 23. The end of the cylindrical section 44 is finished in a plane normal to the axis of the bore to form a fixed valve seat.

The cylindrical bore 45 is formed with a counterbore 60 at its lower end to receive a base portion 61 supporting a tubular stem 62 which forms a mounting for an expansible bellows 63. The bellows 63 is formed with a closed end 64 while the open or opposite end is provided with a cylindrical or attaching portion 65 which if fluid-tightly secured to the stem 62 by any suitable means such as an epoxy adhesive. Obviously, equivalent means such as soldering or the like are equally satisfactory.

The base 61 is provided with a circumferential groove 66 which receives an O-ring 67 sized so as to seal the base to the chamber 45. The base 61 is also provided with an axial bore 68 which receives a fluid line 70 which is in communication with the interior of the expansible bellows 63 through a coaxial bore 71 formed in the upstanding port of the stem 62. The stem 62 is held positioned within the counterbore by any suitable means, such as the end cap 72 shown which is threadably joined to the bonnet 24.

The closed end 64 of the bellows 63 is maintained in engagement with one end of a valve stem 73. The opposite end of the valve stem 73 is formed with an integral knob 74 of generally frusto-conical shape and having on the underside a radially extending surface 75 which forms the movable valve seat. A spiral spring 76 engages the frusto-conical surface and has the opposite end bottomed against the shoulder 26 formed in the counterbore 25. A second spring 77 is bottomed against the shoulder 46 in the counterbore 45 and has the opposite end engaged with the closed end of the bellows 63 to return it to a compressed condition. As is apparent in the embodiment shown in FIG. 1, when the movable seat 75 is in engagement with the fixed seat 52, flow through the ports 36 and 37 is cut off. At this time, the bypass lines 32 and 33 are available for distribution of the refrigerant entering the bore 28.

An evaporator 80, which may be of any suitable configuration, is interposed between the capacity control valve 22 and the compressor 11. The evaporator 80 is provided with a series of pass lines 81, 82, 83 and 84 which form a passage for the refrigerant to enter and expand, taking on heat from air passing over the cooling fins of the evaporator. As is well known, the evaporator in a residential-type system is located in the plenum of the furnace. Air is drawn in through the cold air return and blown across the evaporator for distribution through the existing duct work to the various rooms of the residence.

The refrigerant is returned from the evaporator 80 through the line 85 via the collecting chamber 86 formed on the exhaust side of the evaporator 81. The line 85 is joined to the suction side of the compressor and where the expanded refrigerant in its gaseous state is compressed for recycling through the system.

The bulb 18, line 17 and bellows chamber in the expansion device 16 usually form a closed circuit which is filled with refrigerant such as Freon or the like. If the refrigerant passing through the evaporator 80 is at such a state whereby it could possibly return from the gaseous state to a liquid state, the fluid in the bulb 18 is expanded to cut off the flow through the expansion device, allowing the vapor in the evaporator to become more "heated" and protecting the compressor 11 against liquid being returned. This performs only a safety function, and while it may have some effect on the efficiency of the cooling system, it is usually not intended as a temperature control means. The pressure balancing line 20 communicates with the bellows chamber in known types of expansion valves to compensate for the pressure drop of the refrigerant as it passes through the evaporator.

As is apparent in the present design, the bypass lines 32 and 33 are connected to the pass lines 83 and 84 through the evaporator 83. The outlet lines 34 and 35 extending from the capacity control valve 22 are joined to the pass lines 81 and 82 with the exhaust side of each of these lines joined to the chamber 86. It can be appreciated that when the capacity control valve is in the condition shown, refrigerant will pass through the evaporator 80 only in the pass lines 83 and 84, while flow is cut off through the lines 81 and 82. The significance of this will become apparent when the operation of the system is described.

Figure 3:
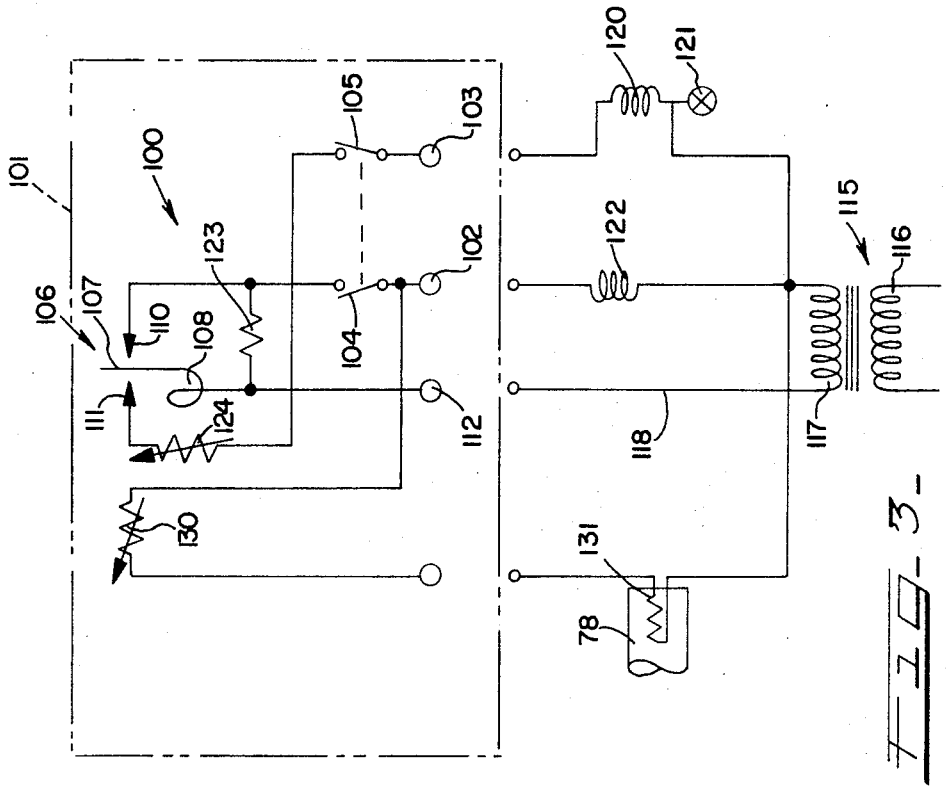
FIG. 3 is a schematic diagram of an electrical circuit used for controlling the system incorporating the capacity control valve.

Referring now to FIG. 3, an electrical system is illustrated which may be used to control the conventional combination heating-cooling system in a residence. The circuit indicated at 100 and enclosed in the phantom line box 101 consists of that part of the control which is normally found at the site of the thermostat control in the residence. For the most part, this control circuit is similar to known forms of control circuits used in conventional types of residential central heating and cooling systems. The circuit consists of cooling and heating lines 102 and 103, respectively, having a pair of gang switches 104 and 105 in each. The gang switches 104 and 105 may consist of a three-position switch having "off," "cool" and "heat" positions. As illustrated, the switch is in the off position and the switch blades 104 and 105 are open and the circuit is in a de-energized state.

A conventional thermostat is indicated at 106 having a switch portion 107 and sensing element 108 indicated schematically. Contacts 110 and 111 are provided for cooling and heating and, when contacted by the switch blade 107, completes the circuit inasmuch as the thermostatic blade 107 is connected through the sensing element 108 to ground 112. The circuit is completed by attachment to the terminals shown outside the box shown in phantom and includes a transformer 115 having its primary 116 connected to the conventional electrical 110-volt source. In conventional designs, the secondary winding 117 of the transformer is operated at low voltage, being of the order of 12 or 24 volts. One side 118 of the secondary winding 117 is joined to the common terminal 112 while the opposite side is joined through the heating switch 105 through the coil 120 of the solenoid operated gas supply valve indicated schematically at 121. The secondary winding 117 is also connected through the coil 122 of a solenoid operated switch which controls the power supplied to the compressor 11. The usual cold anticipator 123 and variable heat anticipator 124 are provided in the thermostat circuit.

As can be appreciated, when the switch 105 is moved to the closed position and the thermostatic sensing element 108 moves the switch blade 107 into engagement which the contact 111, the circuit is complete and the gas supply valve 121 is moved to the open position by energizing the solenoid 120. The furnace may then heat the residence. When the switch 104 is in the closed position and the switch blade 107 is moved against the contact 110, a circuit is completed through the coil 122 of the solenoid operated switch and the compressor 11 is energized. This mode of operation is like that experienced in existing types of systems.

The present invention adds to this control circuit an additional circuit in parallel with the coil of the solenoid 122 and consisting of a variable resistor 130 and a heating element 131. The variable resistor 130 is also located in the thermostatic control and serves to control the flow of current through the heating element 131. As indicated schematically, the heating element 131 is located either beneath the bulb 78 or may be suitably insulated and immersed in the fluid which fills the closed circuit formed by the line 70, expansible bellows 63 and sensing bulb 78. The latter of these alternatives has the greater sensitivity and quicker response.

Figure 2:
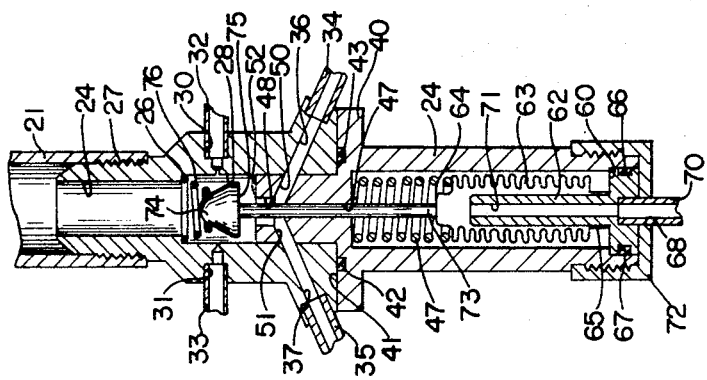
FIG. 2 is an enlarged cross-sectional view of the capacity control valve of FIG. 1 when in the open position.

When the sensing circuit is heated slightly, the volume of fluid increases, expanding the bellows 63 and causing the valve to move to the open position as shown in FIG. 2. In such condition, fluid is admitted through the opening 48 to the outlet ports 36 and 37 for passage through lines 34 and 35 to the pass lines 81 and 82. It can be appreciated that flow of refrigerant through the valve may be readily controlled by a simple adjustment of the variable resistor 130, with the resultant effect on cooling capacity.

Having described the components of the system, the operation of the capacity controlled cooling system will now be described.

In operation, the switch 104 in the circuit of FIG. 3 is moved to the closed position, establishing a circuit through the coil 122 and contact 110. When the thermostatic setting approaches the point where cooling is demanded, the switch 107 moves against the contact 110, completing the circuit through the terminal 112 and lines 118 and energizing the switch coil 122. The switch contacts, which supply the voltage and current to the compressor 11, are closed by the solenoid coil 122 and the compressor is energized. Refrigerant is taken in through the suction line 85 shown in FIG. 1 and fed through the condensor 12 where it is cooled and in a liquid state is forced to the expansion device 15 which, in the present illustration, may consist of an expansion valve. As long as the demand for cold exists and the fluid returning in the return line 85 is in a vapor state, the expansion device 15 will remain open and the compressed liquid will be admitted into the line 21 for transmission to the evaporator. In actual practice, the expansion device and capacity control will be located as close as possible to the evaporator so that all expansion will occur within the passes in the evaporator for optimum cooling efficiency.

The liquid is admitted through the lines 32 and 31 into the pass lines 83 and 84 where it expands and causes cooling of the fins which form the heat exchange portion of the evaporator 80. The air flow over the evaporator causes a warming of the gaseous refrigerant which is returned through the chamber 86 and suction line 85 for recompression. When the temperature of the air is warm, the air flow over the evaporator 80 causes the liquid in the closed circuit consisting of the bulb 78, line 70 and chamber formed by the bellows 63 to expand moving the valve to the open position shown in FIG. 2. Maximum cooling is experienced when the valve is in this position, as all pass lines through the evaporator are being used for cooling.

As the temperature of the air flowing over the evaporator is out into the room in which the thermostat is located approaches the set point, the closed circuit is designed and adjusted such that the movable seat 75 of the valve gradually moves toward the fixed seat 52 to cut off flow. At this time, only the pass lines 83 and 84, which are connected to the bypass, are fully operative. Inasmuch as these lines provide the flow path for the compressed liquid, the section of the evaporator supplied will run at a much colder temperature. This has the effect of collecting more condensate than would be the normal case if the same volume of refrigerant were distributed throughout the entire evaporator. Hence, while the cooling rate is reduced, the dehumidification rate will increase. The condensate is carried out to an external source by conventional means.

As can be appreciated, the amount of refrigerant that can flow through the bypass lines is limited and, in general, can be limited only to what is necessary to supply the cooling needs of the compressor. In this manner, the compressor will continue to operate and the system remain operative to extract moisture from the air. The cooling rate will be somewhat less than would be the case if the control valve 22 was open and the compressor 11 was operating at full capacity. Thus, as the temperature passes to the lower set point where the thermostat will cut off the compressor, the rate at which the temperature is lowered is far more gradual and greater dehumidification of the air is obtained. While the compressor may run for longer periods of time, the temperature and humidity of the residence will be far more uniform. Accordingly, the fluctuation of temperature and humidity will be such that the discomfort normally experienced with conventional systems is eliminated.

If it is desirable to control the valve 22 artificially, the variable resistors 130 may be adjusted to cause the current to flow in the heating element 131. This gradual increase in heat causes expansion of the liquid in the closed circuit, causing the valve to stay open even though the air temperature has reached the point at which the bulb is set for valve closing. As can be appreciated, this novel remote control arrangement is applicable to valves of any type.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A capacity control valve of the type used in controlling the flow of refrigerant to an evaporator, said capacity control valve comprising a body having a cylindrical bore, a stationary valve seat disposed in said bore, a fluid inlet port opening into said cylindrical bore on one side of said valve seat, at least one fluid outlet port disposed on the same side of said valve seat as said inlet port, at least one fluid outlet port on the opposite side of said valve seat, a valve stem disposed in said cylindrical bore and extending through a bore of reduced diameter formed in an end wall of a bonnet joined to said body, a movable valve means carried on said stem and adapted for engagement with said stationary valve seat, means urging said movable valve means into engagement with said valve seat to cut off flow through said outlet port on the opposite side of said valve seat thereby to eliminate flow to a portion of said evaporator, and means responsive to a change in temperature of the air flowing over said evaporator acting to shift said valve stem and said movable valve means away from said valve seat thereby to open said valve and permit flow therethrough to said outlet port on the opposite side of said valve seat and to said evaporator.

2. The capacity control valve of claim 1 wherein said means responsive to a change in temperature to open said capacity control valve comprises an expansible bellows having a closed end, said valve stem having one end thereof in engagement with said closed end whereby expansion of said bellows will open said valve, a fluid line having one end thereof communicating with the interior of said expansible bellows, the opposite end of said fluid line being closed and formed to provide a sensing bulb adapted for placement in the path of air flow over said evaporator whereby increases in the temperature of said air will cause expansion of said fluid in said fluid line to expand said bellows, causing opening of said capacity control valve when the temperature of air passing over said evaporator is above a predetermined level.

3. A capacity control valve of the type used in controlling the flow of refrigerant to an evaporator said capacity control valve comprising a body having a cylindrical bore, a stationary valve seat disposed in said bore, a fluid inlet port opening into said cylindrical bore on one side of said valve seat, at least one fluid outlet port on the opposite side of said valve seat, a valve stem disposed in said cylindrical bore and extending through a bore of reduced diameter formed in an end wall of a bonnet joined to said body, said stationary valve seat being formed on said bonnet coaxial with said bore of reduced diameter, a movable valve means carried on said stem and adapted for engagement with said stationary valve seat, means urging said movable valve means into engagement with said valve seat to cut off flow through said outlet port on the opposite side of said valve seat thereby to eliminate flow to a portion of said evaporator, and means responsive to a change in temperature acting to shift said valve stem and said movable valve means away from said valve seat thereby to open said valve and permit flow therethrough to said evaporator.

* * * * *